United States Patent [19]

Ewing

[11] 3,937,376
[45] Feb. 10, 1976

[54] VEHICLE SUPPORT FOR WHEELED VEHICLES

[76] Inventor: Marlin B. Ewing, 259 S. Bayshore Drive, Valparaiso, Fla. 32580

[22] Filed: Sept. 16, 1974

[21] Appl. No.: 506,022

[52] U.S. Cl............................ 224/42.08; 224/42.44
[51] Int. Cl.² ........................................... B60M 9/00
[58] Field of Search............ 224/42.08, 42.06, 42.07, 224/42.03 B, 42.03 A, 42.03 R, 42.43, 42.44; 211/17, 18, 19, 20, 21; 214/450

[56] References Cited
UNITED STATES PATENTS

| | | | |
|---|---|---|---|
| 1,977,734 | 10/1934 | Monckmeier | 224/42.08 |
| 2,432,732 | 12/1947 | DelCano | 224/42.03 B |
| 3,115,978 | 12/1963 | Anderson, Jr. et al. | 214/450 |
| 3,794,227 | 2/1974 | Stearn | 224/42.03 B |
| 3,800,967 | 4/1974 | Kosecoff | 224/42.03 B |
| 3,807,592 | 4/1974 | Lynn | 214/450 |
| 3,841,544 | 10/1974 | Berger | 224/42.03 B |

FOREIGN PATENTS OR APPLICATIONS

| | | | |
|---|---|---|---|
| 63,784 | 2/1949 | Netherlands | 224/42.03 B |

Primary Examiner—Philip Goodman
Assistant Examiner—David M. Mitchell
Attorney, Agent, or Firm—Patrick F. Henry

[57] ABSTRACT

A wheelchair support is attached to and extends from the bumper of an automobile and may be swung upwardly out of the way when not in use. A support frame for confining the wheels comprises members which define wheel recesses on opposite sides of an intermediate member, which carries an adjustable retaining member. The frame is supported on pivoted arms attached to a mounting frame having adjustable clamps which fit on and tighten to a conventional automobile bumper. A collapsed wheelchair is tilted upwards to place the large wheels in the well. Downward rotation of the wheelchair in the support frame causes the wheelchair frame to engage the retainer which secures the wheelchair in place.

11 Claims, 6 Drawing Figures

U.S. Patent  Feb. 10, 1976  Sheet 1 of 2  3,937,376
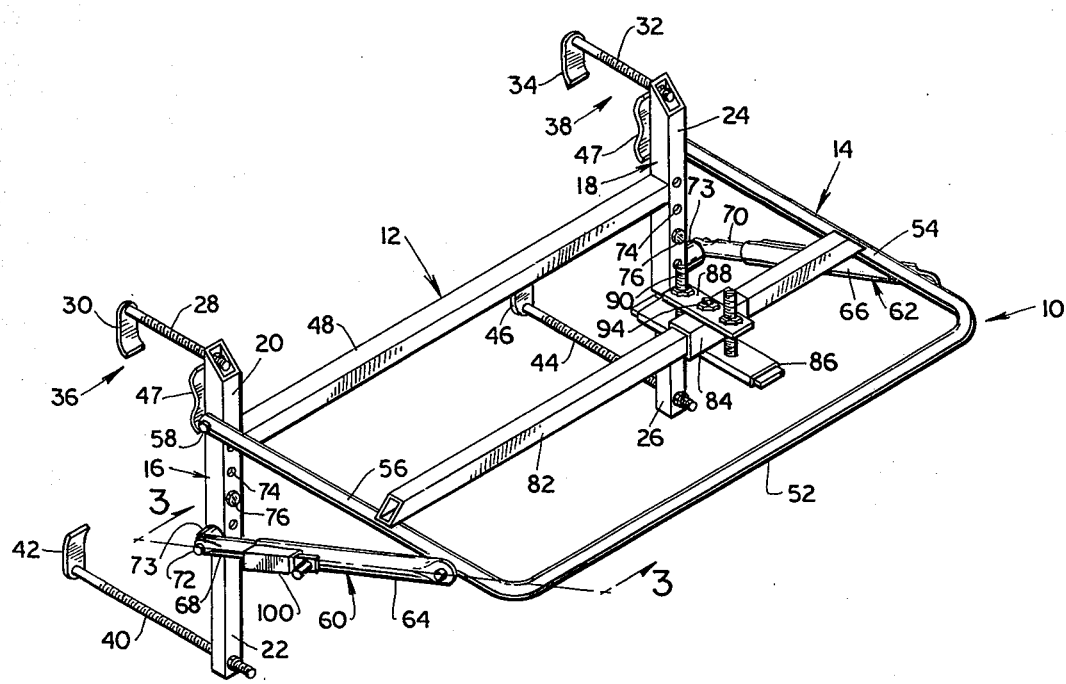
FIG 1
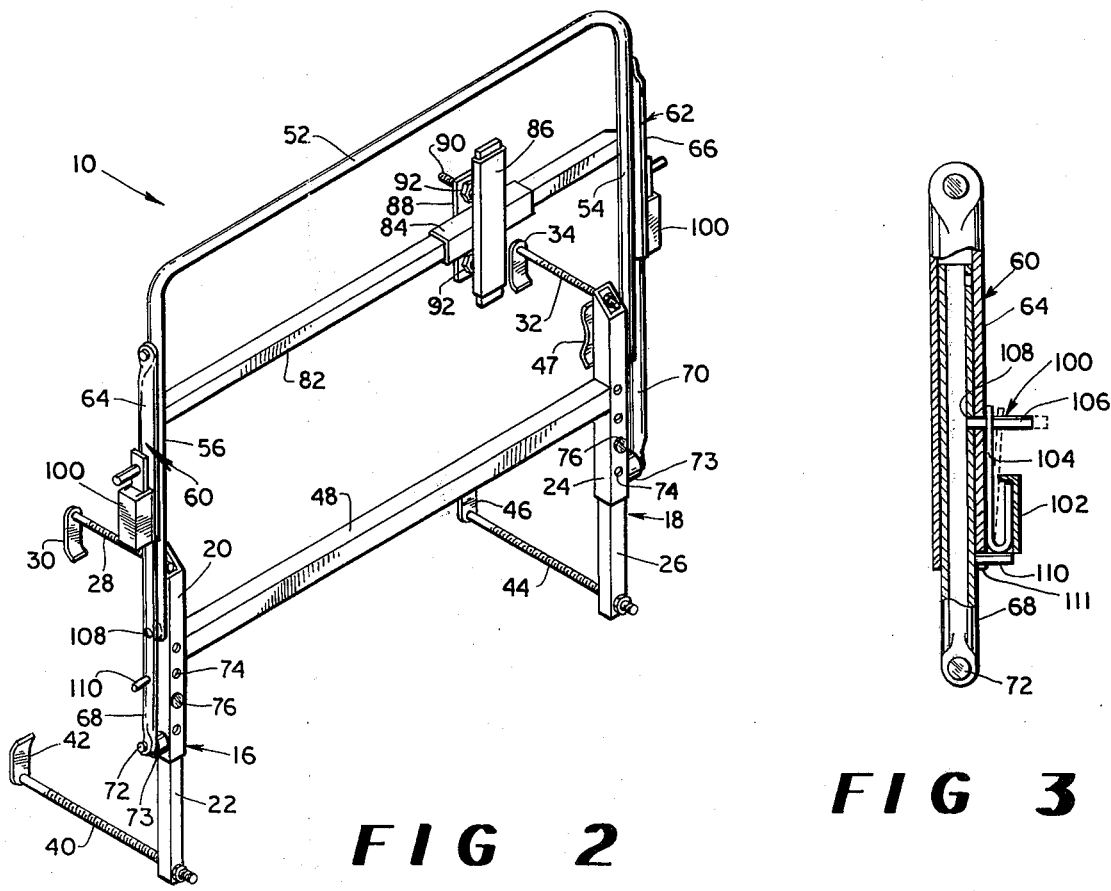
FIG 2
FIG 3

VEHICLE SUPPORT FOR WHEELED VEHICLES

BACKGROUND OF THE INVENTION

1. Field of the Invention

Vehicle mounted article carrying devices. Racks and supports for wheeled articles (Search field possibilities: 224/42.07; 42.03A; 42.06; 42.03B; 42.03R).

2. Background of the Invention

The prior art includes rigid trunk and luggage carrying devices attached to the front or rear of automobiles. These are not suitable for attachment to present day automobiles nor would they be satisfactory for convenient transport of a wheelchair. There are also various types of vehicle carriers such as bicycle racks which attach to the bumper and have projecting supports on which the bicycle is mounted. These are not suitable for supporting wheelchairs because the mounting of the bicycle or other article requires considerable lifting, positioning and attachment in place.

It is important that a wheelchair support be close to the ground to require minimum lifting and that securing the wheelchair in place be without effort. The device should not protrude from the back of the car when not in use and should not interfere with the use of the trunk space. It is also essential, of course, that such racks be reasonable in construction so that they may be purchased economically.

SUMMARY OF THE INVENTION

An object of this invention is to provide a wheelchair support which is mounted on the bumper of an automobile and may be swung from an upward stored position to a downward operative position to receive a folded wheelchair therein.

Another object of this invention resides in the particular construction and operation of the retaining device which requires only that the wheelchair wheels drop into position on a frame so that the retaining device will cause automatic engagement against a portion of the frame of the wheelchair. The retaining device is adjustable vertically and horizontally to accommodate varying sizes of wheelchairs.

Another object of the present invention resides in the provision of a simple open frame which folds down like a shelf approximately at the height of an automobile bumper to require minimal effort in lifting the wheelchair.

An additional object of this invention resides in the particular construction of the frame and the wheelchair retaining mechanism which is simple, reliable and readily used yet economical and very durable in operation.

Other and further objects and advantages of this invention will become apparent upon reading the following specification taken in conjunction with the accompanying drawings.

BRIEF DESCRIPTION OF THE DRAWINGS

FIG. 1 is a perspective view of the present support in extended, operative position without the wheelchair in place.

FIG. 2 is a perspective view of the support shown in FIG. 1 in the upward, folded position for non-use.

FIG. 3 is a cross-sectional view taken substantially along lines 3—3 in FIG. 1.

Description of the Preferred Embodiment

Figure 4:
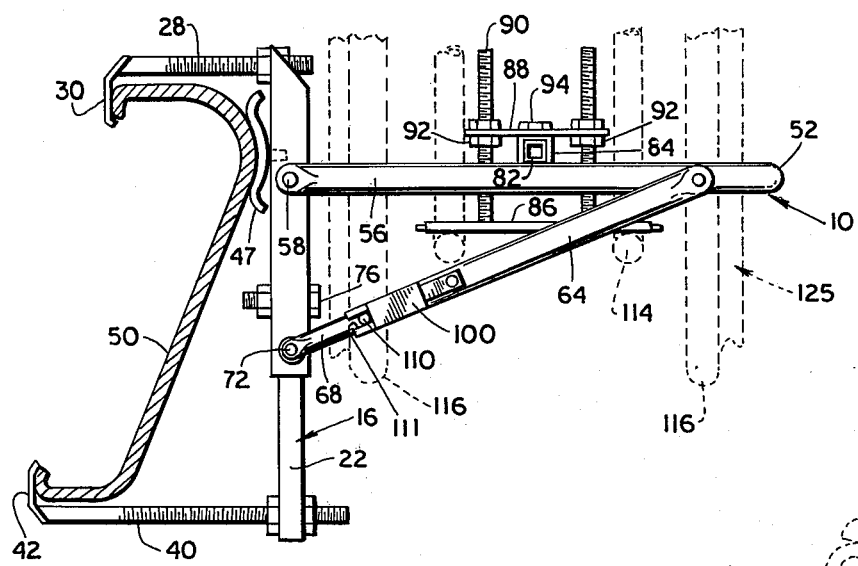
FIG. 4 is a side elevation view of the support in the position of FIG. 1 with the automobile bumper shown in vertical cross-section.

The entire support is designated in the drawings by reference numeral 10 and it comprises a substantially vertical mounting frame designated in the drawings generally by reference numeral 12 and a foldable or swingable carrying frame designated generally in the drawings by reference numeral 14.

The mounting frame 12 comprises a pair of spaced vertical tube members or substantially rectangular cross-section and each tube member 16, 18 comprising a pair of slidable members designated as upper member 20 and lower member 22, of the vertical member 16, and upper member 24 and lower member 26, of the vertical tube members 18. Upper members 20, 24 each carries in threaded engagement thereon a part of a clamp device which comprises a screw shaft 28 having a curved foot 30 and an identical screw shaft 32 on the other side on upper member 24 having an identical foot 34. Each clamp device on each side which are designated generally and overall by reference numerals 36, 38 comprises a lower threaded screw shaft 40 threadedly mounted on lower member 22 and having a foot 42 and on the other side an identical threaded shaft 44 on lower member 26 having a foot 46. Contoured bumper pads 47 are adjustably attached to each respective upper member 20, 24 for vertical alignment by hole inserts in 20, 24 (not shown).

The respective pairs of members comprising vertical members 16, 18 are slidably engaged, that is, member 22 slides inside of member 20 and member 26 slides inside of member 24 so that adjustment in a vertical direction may be effected in order to adjust the distance between the respective screw shafts 28, 40 and 32, 44 to adjust the clamping devices 36, 38 to fit on various bumpers or other mounting surfaces.

A rigid frame member 48 connects the upper members 20, 24 thereby providing a rigid mounting frame which may be removably but permanently mounted on place on an automobile bumper designated by reference numeral 50, or any other surface.

The swingable carrying frame 14 is pivoted for movement and comprises a U-shaped frame closed by frame member 48, consisting of a forward frame member 52 and opposite side members 54, 56 respectively attached by the ends thereof by pivot pins 58 to respective upper members 20, 24. A pair of respective side supports and braces 60, 62 each comprises a respective outer tube member 64, 66 and a respective inner member 68, 70 providing a sliding relationship between the respective inner and outer tubes. Each respective inner tube 68, 70 has one end pivotally attached by means of pivot pin 72 and a bushing and spacing member 73 to a respective upper member 20, 24 to be carried thereby and adjusted therewith.

The respective upper members 20, 24 and lower members 22, 26 are, as previously mentioned, adjusted through relative movement by means of respective holes 74 in which is inserted a screw 76 at the desired location in matching holes (not shown) in the lower members 22, 26.

Thus, from the foregoing description it is seen that the pivotal and swinging wheelchair carrying frame 14 is adjustably carried by the rigid mounting frame 12 which in turn may be adjusted on the surface, such as the bumper 50, to which the entire device 10 is mounted.

Mounted on the frame 14 and extending substantially parallel to the forward frame member 52 is the retainer support member 82 which in the present embodiment is in the form of a rectangular tube on which is mounted a rectangular sliding collar 84 which carries an adjustable retaining arrangement comprising a pair of opposed, spaced plate members 86, 88 which are adjusted respective to each other by means of threaded studs 90 on opposite sides which have one end attached to the plate 86, which is padded to prevent scratching, etc., and the other ends fastened in place on plate 88 by means of respective pairs of nuts 92 on opposite sides thereof. Plate 88 is permanently fixed to sliding collar 84 which is held in properly adjusted position on member 82 by set screw 94. The operation of retainer arrangement is described later.

The side braces 60, 62 are adjusted in place by means of a latch mechanism on each one designated generally by reference numeral 100 and comprising a fixed housing 102 on each of the respective upper outer members 64, 66 and in which housing 102 is mounted the bent end of a leaf spring 104 on the outer end of which is a pin 106 that fits into a hole 108 in both the outer members 64, 66 and the inner members 68, 70. The side braces 60, 62 automatically lock in extended position when the frame 14 is pulled downwardly as shown in FIG. 1 by means of a fixed limit pin 110 which bumps the lock pin 106, which rides on the surface of member 64, into hole 108. The end of member 64 is notched at 111 to engage pin 110. Pin 106 is manipulated by hand when the carrying frame 14 is pivoted from the carrying position in FIG. 1 to the stored position in FIG. 2 so as to pull the pin from the hole 108 and when the carrying frame 14 is in the carrying position shown in FIG. 1 the pin 106 is in hole 108 on each of the side braces, 60, 62, to hold the carrying frame 14 in rigid carrying position. A second hole is placed in the respective inner tube 68, 70 (not shown) so that the side braces may be held in place in the folded vertical position as in FIG. 2 with pin 106 projecting through hole 108 in outer tube 64, 66 and through the second hole in inner tube 68, 70.

Figure 6:
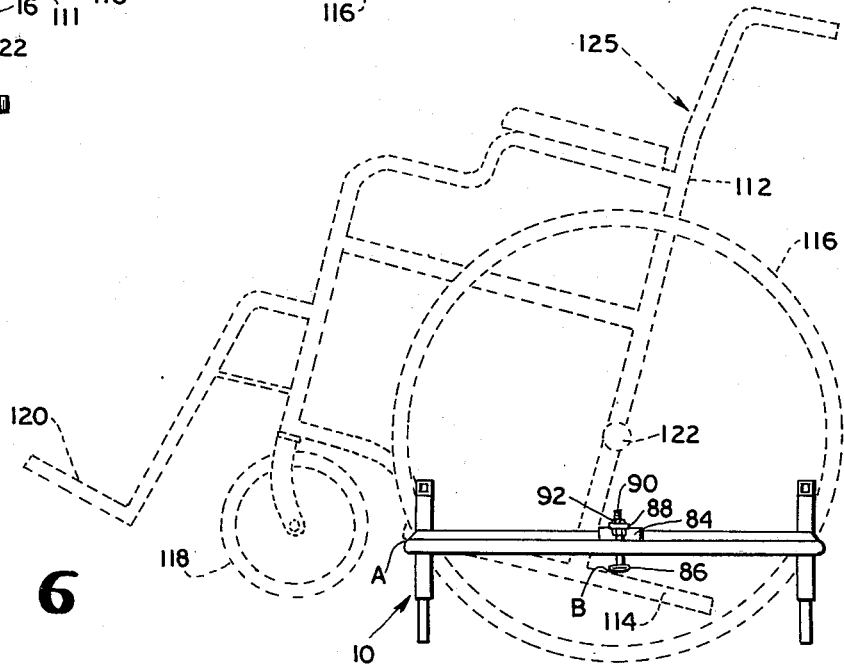
FIG. 6 is a view the same as that in FIG. 5 with the wheelchair rotated into final carrying position with a portion of the wheelchair frame locked under the retaining member.
Figure 5:
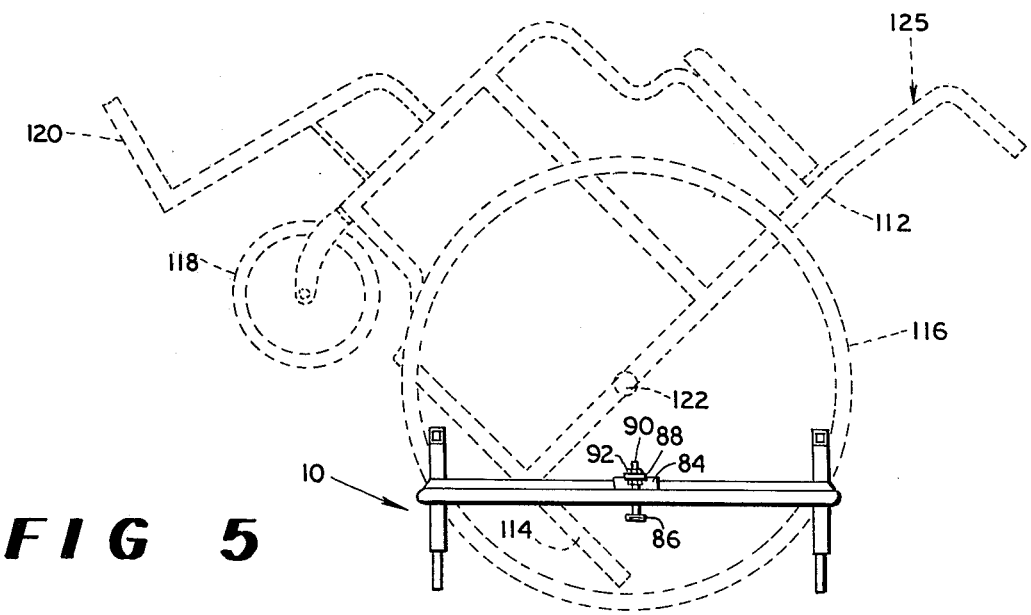
FIG. 5 is an end elevation view of the support in the position of FIG. 1 receiving a folded wheelchair therein in the first position of location.

In the operation of the device it is shown in FIGS. 5 and 6, a conventional folded wheelchair designated generally by reference numeral 125 comprises a vertical frame 112 and a bottom frame 114 which includes a backward projecting portion. The wheelchair 125 includes the usual two, spaced large rubber-tired wheels 116 which collapse closer together when folded, and the front caster wheel 118 together with a footrest 120 and other parts and components which are conventional with wheelchairs. With the carrying frame 14 extended in the position of FIG. 1 the wheelchair is lifted and tilted so that as the wheelchair is lowered the bottom frame 114 passes by plate member 86 whereupon the chair is released and the lower frame 114 is pivoted into position about the axle 122 of the wheelchair to bring the frame 114 beneath and in engagement with, or very close to member 86 which acts as a retainer member at point B, thereby securing the wheelchair 125 in place and firmly securing the cushioned tire or wheel 116 into the space defined on opposite sides of member 82 in the carrying frame 14 which accommodates the two wheels 116 of the wheelchair. The forward end of bottom frame 114 comes to rest on side member 56 at point A thus providing a firm forward support for the wheelchair 125. The conventional wheelchair brake may be set to prevent relative rotation between frame 114 and wheel 116.

While I have shown and described a particular embodiment of this invention together with suggested mode of operation thereof, and presented same in conjunction with a conventional wheelchair, it is obvious that other wheeled articles which fit into the space defined in the carrying frame 14 may be used and that various alterations, changes, eliminations, deviations, revisions, departures may be made in the present invention without departing from the scope thereof as defined in the appended claims.

What is claimed:

1. In a wheelchair support for attachment to an automobile bumper or other surface for supporting a folded wheelchair of the type including large rear wheels and a bottom frame having a backward projecting portion:
    a. a wheelchair carrying frame comprising opposed side frame members defining a space receiving therein the large, vertically disposed wheels of said folded wheelchair with the periphery of the wheels partly below said carrying frame resting in the space defined by and on the opposed side frame members and with the projecting portion of the wheelchair bottom frame within the confines of said carrying frame,
    b. means on said carrying frame for attaching and supporting said carrying frame on the bumper or the surface in horizontally extended carrying position,
    c. a retainer support member on said carrying frame and a retainer member on said retainer support member, said retainer member being engaged from beneath by the wheelchair bottom frame when said wheels are in said space and the projecting portion of the wheelchair frame is projected and rotated within said space thereby preventing the movement of the lower frame in vertical or rotational direction about the engagement of the rear wheels with the side members which define the space, whereby a person without the use of his legs may insert the wheelchair in place on the carrying frame and lock the wheelchair wheel to prevent relative rotation between wheelchair frame and wheel.

2. The device in claim 1 wherein said retainer member on the retainer support member is supported within and projects into said space, to engage the wheelchair frame therein.

3. The device in claim 1 wherein said retainer member comprises a plate, and means for adjusting said plate vertically on said retainer support member.

4. The device in claim 3: including other means for slidably mounting said plate on said support member for lateral movement between said side frame members.

5. The device in claim 1 wherein: said means for attaching and supporting said carrying frame includes means for pivoting said carrying frame to a vertical non-carrying position, said carrying frame having at least one brace attached thereto and to said means on said carrying frame for attaching and supporting said carrying frame, and means for extending and retracting said brace as said frame is pivoted.

6. The device in claim 5 wherein said brace comprises an inner and outer member assembled for relative, sliding movement, and latch means engageable between said inner and outer members for positively latching said members against movement when said carrying frame is in extended, operative or in folded, non-operative position.

7. The device in claim 6, wherein:
said brace latch means comprises a latch pin selectively engageable in a hole in said inner and outer members, and a spring means for resiliently biasing said pin.

8. The device in claim 7, wherein: said brace outer member has a notch therein and there is a fixed limit pin which is mounted on the inner member, which pin is engaged by said outer member to cause said latch pin to engage in a hole.

9. The device in claim 1 wherein: said means for attaching and supporting said carrying frame comprises spaced members having clamp means thereon for attachment to a surface such as a bumper, and means for vertically adjusting said spaced members.

10. The device in claim 9, wherein: said spaced members comprise inner and outer slidable members, means for selectively adjusting said slidable members to different relative positions.

11. The device in claim 10, wherein: said clamp means comprises upper and lower clamp members.

* * * * *